Figure 1:
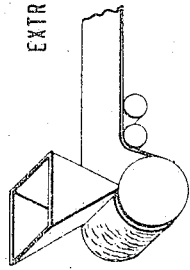

Aug. 15, 1961     F. R. WINTER     2,995,779
TREATMENT FOR POLYMERIC FILM TO RESTRAIN GAUGE VARIATION
Filed March 12, 1959

EXTRUSION AND QUENCHING

TRANSVERSE DIRECTION STRETCHING

LONGITUDINAL DIRECTION STRETCHING OF 3.0–6.0X AND OPTIONAL HEAT SETTING.

INVENTOR
FREDERICK ROBERT WINTER
BY Herbert M. Wolfson
ATTORNEY

United States Patent Office 2,995,779
Patented Aug. 15, 1961

2,995,779
TREATMENT FOR POLYMERIC FILM TO RESTRAIN GAUGE VARIATION
Frederick Robert Winter, Circleville, Ohio, assignor to E. I. du Pont de Nemours and Company, Wilmington, Del., a corporation of Delaware
Filed Mar. 12, 1959, Ser. No. 798,830
11 Claims. (Cl. 18—48)

This invention relates to a process for improving the properties of films of synthetic linear polyesters, particularly the properties of polyethylene terephthalate film.

Stretching films of substantially amorphous polyethylene terephthalate and the like to orient them and, thus, improve their physical properties is well known. In such a process, the polyester prepared from a glycol and a dialkyl ester of a dicarboxylic acid or the dicarboxylic acid itself is extruded as a molten polymer through an orifice to form a film. Thereafter, the film is cooled and stretched longitudinally and then stretched transversely. If desired, the two-way stretched film may be heat-set in the conventional manner. The process described is a continuous one and its details may be found in U.S. Patent No. 2,823,421.

The prior art process has several serious drawbacks. It has been found that gauge variations, i.e., thick and thin areas, in the cast film, resulting from minute non-uniformities in the extrusion orifice, are amplified by the process. In many cases the final gauge variation of the stretched film is intolerable even though the gauge variation of the initial ("as-cast") film was within acceptable limits. Film gauge variations, particularly those measured in the transverse direction, i.e. in a direction transverse to the direction in which the film is extruded and ultimately wound on a roll, present a serious problem in winding up the film to obtain acceptable roll formation. For example, the thicker sections formed in longitudinal paths in a continuous length of film provide hard surfaces on the wound rolls while the thinner longitudinal sections are soft. Such rolls have a tendency to telescope during handling and particularly during winding and unwinding operations. Furthermore, it is difficult to maintain an even tension upon such film when unwinding the roll, thus making slitting difficult. Moreover, film having these relatively high gauge variations across its width is also difficult or impossible to handle in various types of converting equipment such as bag-making machines. Such film is also difficult to handle as photographic film in cameras or projectors, and, as sound or video tape recording and play-back equipment.

Another disadvantage of the stretching process described in U.S. Patent 2,823,421 is that the film has a tendency during the second step transverse stretching in the tenter frame (after longitudinal stretching) to experience a lagging of its central portions behind its edges. This phenomena, hereinafter referred to as "bowing" of the film sheet, results from the high forces set up in the longitudinal direction during transverse direction stretching in the tenter frame. On heat treating the resulting two-way stretched film at elevated temperatures for heat-setting and the like, the film is softened and the high longitudinal forces set up during stretching cause the center of the film to lag behind the edges in relaxing since the center is not subject to the restraint of the tenter clips holding the edges. The resultant film exhibits considerable non-uniformity in thickness and undesirable imbalance in tensile properties particularly if properties are measured at an angle of 45° (along the diagonals) to the longitudinal direction. In addition to the unbalanced tensile properties along the diagonals which are associated with "bowing," unbalanced dimensional stability along these diagonals across the film sheet also results.

It is the object of this invention, therefore, to provide an improved process for the stretching of linear polyester films. A further object is to provide an improved two-way stretching process for polymeric linear terephthalate ester films, particularly polyethylene terephthalate film, which produces an oriented polyethylene terephthalate film having: (1) a minimum of gauge variation as measured transverse to the direction of extrusion (or direction of wind-up); and (2) a substantially uniform balance in tensile properties as measured across and diagonally of the sheet. A still further object is to provide a continuous integrated process for producing polyethylene terephthalate film having enhanced unidirectional physical properties. Other objects will appear hereinafter.

Figure 2:
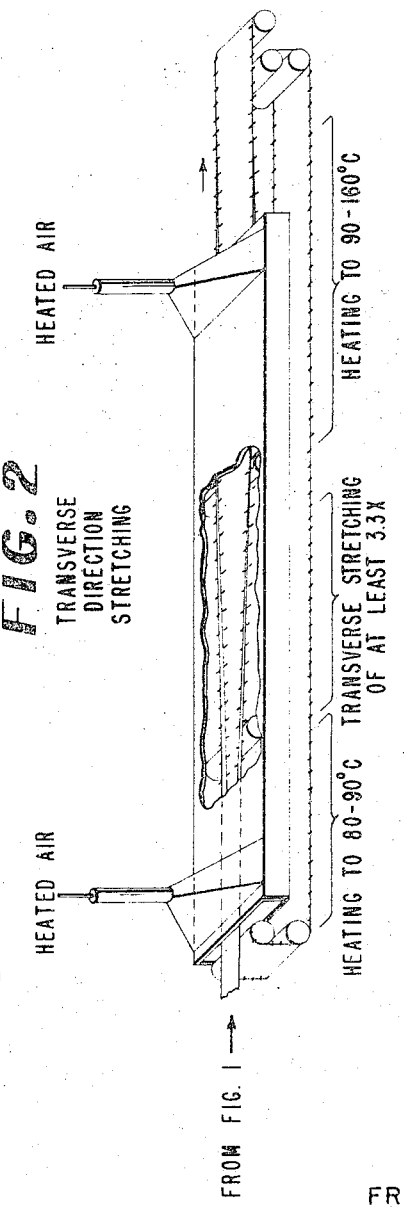
Figure 3:
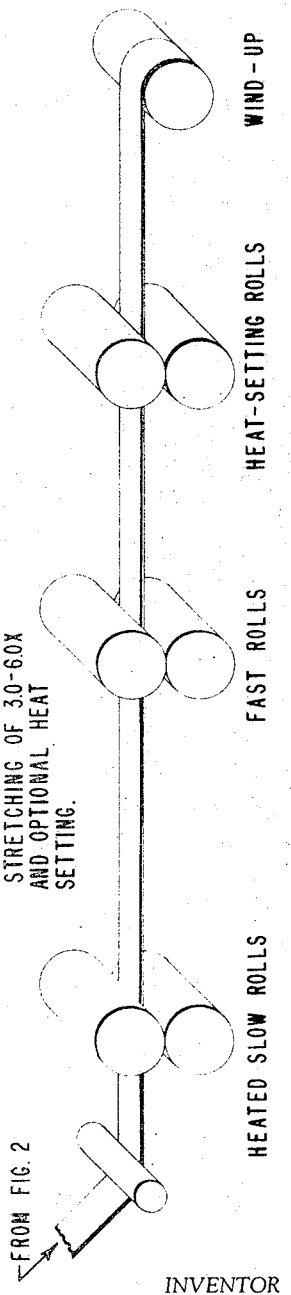

The objects are accomplished by a process which comprises the steps, in sequence, of extruding a substantially amorphous film of a synthetic linear polyester such as polyethylene terephthalate at a temperature of 270°–315° C.; cooling said extruded film to a temperature of 60°–80° C.; heating said film to a temperature of 80°–90° C., preferably 82°–90° C.; drawing said film in the direction transverse to the direction of extrusion to at least 3.3 times its original width, preferably 3.3–4.5 times its original width, at the temperature of 80°–90° C., preferably at 82°–85° C.; thereafter, heating said film to a temperature of 90°–160° C.; and drawing said film in the direction of extrusion 3.0 to 6.0 times its original length at the temperature of 90°–160° C., preferably at 115°–160° C. The resulting two-way stretched films may be heat-set by heating the film to a temperature above that used in the second stretching step and between 135°–250° C. while preventing dimensional change. This process is illustrated in the accompanying schematic drawing, FIGURES 1, 2 and 3 representing a convenient arrangement of apparatus for carrying out the process in a continuous manner.

The invention will be described with regard to polyethylene terephthalate film, such as that formed by the process disclosed in U.S. Patent No. 2,465,319. The polyethylene terephthalate may be prepared by the condensation of ethylene glycol and terephthalic acid or by carrying out an ester interchange reaction between ethylene glycol and a dialkyl ester of terephthalic acid, e.g., dimethyl terephthalate. The films may then be prepared by extruding the molten polymers through a narrow orifice at a temperature of 270°–315° C. and chilling the polymer in film form at 60°–80° C. The present invention is applicable to films prepared from polyethylene terephthalate homopolymer, and also from copolyesters of polyethylene terephthalate. These copolymers are synthetic linear glycol-dicarboxylate polyesters wherein at least about 75 mole percent of the recurring structural units are ethylene terephthalate structural units. Thus, the terephthalate radicals may be the sole dicarboxylate constituent of the recurring structural units, or up to 25% of the recurring structural units may contain other dicarboxylic radicals, such as adipate, sebacate, isophthalate, 5-(sodium sulfo)-isophthalate, bibenzoate, hexahydro-terephthalate, diphenoxy-ethane-4,4'-dicarboxylate, or p,p'-sulfonyldibenzoate radicals, derived from the corresponding dicarboxylic acids or ester-forming derivatives thereof. Similarly, ethylene glycol may be the sole glycol constituent of the polyester, or the polyester may contain up to 25% of another glycol constituent, such as tetramethylene glycol, hexamethylene glycol, decamethylene glycol, trans-p-hexahydro-xylylene glycol, diethylene glycol, bis-p-(beta-hydroxyethoxy)benzene, bis - 1,4-(beta-hydroxyethoxy) - 2,5 - dichlorobenzene, or bis-[p-(beta-hydroxyethoxy)-phenyl]di-fluoromethane.

The invention involves three interrelated critical requirements. To obtain the improvements of the present invention, particularly to obtain gauge uniformity in biaxially-oriented polyethylene terephthalate films, it is necessary to adhere to the specified:

(1) sequence of elongation,
(2) temperature of first direction stretch, and
(3) minimum amount of elongation in the first direction Specifically, the extruded amorphous polyethylene terephthalate film must be stretched first in the direction transverse to the direction of extrusion at a temperature of 80°–90° C. at least 3.3 times its original width. The minimum of 3.3 applies to the optimum temperature of 82° C. The minimum amount of stretch required for other temperatures between 82° C. and 90° C. will be higher, varying according to the following formula:

$$S_m = .025T + 1.25$$

wherein $S_m$ is minimum stretch based on original dimension and $T$ is the temperature in degrees centigrade.

At 80° C., the minimum temperature at which this step should be performed, the film should be stretched at least 3.5 times its original width.

The maximum amount of stretch that should be performed in the first step, the transverse direction stretching step, depends upon the purpose for which the film is being produced. Thus, a film to be used for packaging can be stretched up to about 4.5 times. For packaging uses, it is desirable that the properties of the film be substantially similar in all directions. Hence, the film should be stretched substantially equal amounts in both transverse and longitudinal directions. The film can be stretched up to about 4.5 times in the transverse direction and still permit subsequent stretching up to about 4.5 times in the longitudinal direction.

However, where the ultimate product is a tape (video, sound recording, adhesive, etc.), the amount of stretch in the first, the transverse direction, should be close to the minimum, i.e., the maximum is preferably about 3.5 times. For a tape, the film properties should be substantially better in the longitudinal direction. Hence, the film should be stretched to a greater extent in the longitudinal direction, up to about 6 times its original length. The film can be stretched up to about 3.5 times in the transverse direction and still permit a stretch of about 6 times its initial length in the longitudinal direction. As the necessary longitudinal stretch decreases from 6 times to 4.5 times the film's initial length, the maximum permitted transverse stretch in the first step rises to about 4.5 times the film's initial width.

After the film has been stretched at least 3.3 times its original width in the first stretching step, it is preferred to apply a light heat treatment to the one-way stretched film before proceeding to the longitudinal stretching step. The heat treatment comprises holding the film for a few seconds in the transverse stretching apparatus (tenter frame or the like) at a temperature of 85°–110° C. It is believed that the crystallinity of the film increases during this step making it a stronger film at this point. The one-way stretched, lightly heat treated film does not tend to "neck down" (decrease in width) as much as the untreated one-way stretched film during the subsequent longitudinal direction stretching step.

As mentioned previously, the longitudinal direction stretch may vary from 3.0 to 4.5 times the initial length of the film when substantially balanced tensile properties are desired. When a film possessing enhanced unidirectional physical properties is desired, the film may be stretched up to about 6 times its initial length. The temperature of the film for this stretching step must be higher than that used in the first stretching step and is preferably above that used in the optional heat treatment step. Thus, temperatures of 90°–160° C. may be used with temperatures above 115° C. being preferred.

The means for obtaining the film temperatures used in the various steps is not critical to the present invention. Thus, cooling may be obtained by blowing air or spraying liquid on the film or contacting the film with a cool surface. For heating, radiant or infrared methods may be used. Blowing heated air or other gaseous media on the film or contacting the film with heated surfaces may also be employed.

The stretching apparatus used is not critical either. For transverse stretching, the conventional tenter frame utilizing a chain of tenter clips which grasp the edges of the film and move outward to stretch the film may be used. For longitudinal stretching, the film may be passed between or around a pair or a series of slowly rotating rolls, which may be heated to the desired temperature, and then between or around a pair or series of rapidly rotating rolls.

The invention will be more clearly understood by referring to the examples which follow, Example 1 being the best mode contemplated for carrying out the invention.

The advantages of the invention will be apparent from the examples. The primary advantage lies in the aforementioned improvement in transverse direction gauge uniformity. The uniformity will be shown in the examples as either "percent gauge variation" or "gauge magnification."

Percent gauge variation (V) is obtained by measuring the thickness of a sheet of film across its width and substituting in the following equation:

$$V = t_2 - t_1 / t_0 \times 100$$

wherein $t_2$ is the thickness of the thickest section,
$t_1$ is the thickness of the thinnest section,
$t_0$ is the average thickness of the film.

Values of gauge variation greater than 10% cannot be tolerated in commercial practice.

Gauge magnification (M) is defined as $V_s / V_1$ wherein $V_s$ is the percent gauge variation in the final stretched film,
$V_1$ is the percent gauge variation in the initial extruded film.

Values of gauge magnification should approach unity (1) indicating little effect of stretching on the gauge variation. Values less than one indicate that stretching has actually improved the gauge uniformity.

The process of the invention also provides improvements in other properties and in the balancing of properties (reduction in "bowing"). Some of the other properties provided in the examples are tenacity, modulus, elongation, $F_5$ value and dimensional stability. As used herein, tenacity or tensile strength is intended to mean the amount of pull or directional force, conventionally expressed in pounds per square inch (p.s.i.), which is required to break the film at room temperature. Modulus or initial tensile modulus, also expressed in p.s.i., is the slope of the stress-strain curve at an elongation of 1% as the film is being elongated at a rate of 100% per minute and is a measure of bend and stiffness. Elongation is the extent to which a film will stretch before breaking upon being subjected to unidirectional tension at room temperature at a constant rate of 100% per minute. The $F_5$ value is the tensile strength measured at an elongation of 5%. Dimensional stability is a measure of the ability of the film to resist shrinkage at elevated temperatures. A measurement of thermal dimensional stability may be obtained by hanging an otherwise unrestrained sample of the film of known dimensions in an oven at a known elevated temperature, about 5°–30° C. below the heat-set temperature for a given time, about 30 minutes, measuring the new dimensions and expressing the difference in dimensions over the original dimensions as a percent shrinkage.

EXAMPLE 1

This example illustrates the preparation of an oriented polyethylene terephthalate film having substantially balanced tensile properties utilizing the preferred embodiment of the process of the present invention. Substantially amorphous polyethylene terephthalate film was extruded at a temperature of about 280° C. onto a quench drum where it was chilled to a temperature of about 75° C. and then stretched transversely in a tenter frame, the extruder and tenter frame being similar to that described in U.S. Patent 2,823,421. The amount of stretch imparted to the film in the transverse direction (TD) was 3.5 times (3.5×) its original width. Stretching was performed at a temperature of 82° C.

The film was heated and held at 110° C. for a few seconds on an extension of the tenter frame to increase the crystalline level of the film. The film was then stretched in the longitudinal or machine direction (LD) to an extent of 3.2× at a temperature of 135° C. in a conventional nip roll stretching apparatus. The apparatus used comprised a nip roll web stretcher of two sets of differentially driven pull rolls. The first set of rolls included a radiantly heated top roll covered with silicone rubber and an inductively heated metal coated bottom roll. The second set of rolls included a neoprene covered top roll and a metal plated bottom roll. The amount of stretch was controlled by varying the differential speeds of the two sets of rolls in amounts to effect a longitudinal stretch of 3.2× based on the length of the film prior to longitudinal stretching.

The film was then heat treated (heat-set) in the nips of a set of driven rolls heated to a temperature of 215° C. while the film was held under tension. The film was cooled and released.

Table I below lists the physical properties of the film prepared as above compared to a conventionally prepared polyethylene terephthalate film stretched three times its initial length in the first step and then three times its initial width in the second step in the manner described in U.S. Patent 2,823,421.

Table I

|  | Reverse Sequence Stretching | Conventional Sequence Stretching |
|---|---|---|
| Modulus, p.s.i.: | | |
| LD | 6×10⁵ | 5.3×10⁵ |
| TD | 6×10⁵ | 4.6×10⁵ |
| Tenacity, p.s.i.: | | |
| LD | 31,000 | 21,600 |
| TD | 31,000 | 24,800 |
| Elongation, percent: | | |
| LD | 105 | 100 |
| TD | 105 | 167 |
| Dimensional stability, percent at 200° C.: | | |
| LD | 8 | 8 |
| TD | 8 | 8 |
| Final average thickness, mil | 0.25 | 0.25 |
| Transverse direction gauge variation | 6.2 | 12.4 |

As can be seen from Table I, the film prepared by the process of the present invention exhibits not only a high degree of balance in its physical properties, but also exhibits a marked superiority over conventionally oriented films in property levels, particularly in the substantially reduced transverse direction gauge variations.

EXAMPLE 2

This example illustrates the preparation of an oriented polyethylene terephthalate film having enhanced unidirectional physical properties utilizing the same equipment as described in Example 1.

Substantially amorphous polyethylene terephthalate film, extruded and quenched as in Example 1, was first stretched in the transverse direction in a tenter frame to an extent of 3.4× at a temperature of 85° C. The film was held at 110° C. for a few seconds on an extension of the tenter frame to increase the crystalline level of the film. The film was then stretched longitudinally between the nips of two sets of differential speed pinch rolls to an extent of 4.5× at a temperature of 145° C. The film was then heat treated (heat-set) at a temperature of 185° C. while the film was held under tension.

Table II, below, lists the physical properties of the resulting film.

Table II

| | |
|---|---|
| Modulus, p.s.i.: | |
| TD | 4.08×10⁵ |
| LD | 8.70×10⁵ |
| F₅, p.s.i.: LD | 22,690 |
| Elongation, percent: | |
| TD | 121 |
| LD | 37.3 |
| Dimensional stability, percent at 150° C.: | |
| TD | 9.66 |
| LD | 11.06 |
| Final thickness, mils | 0.6 |
| Transverse direction gauge variation, percent | 5.1 |
| Tenacity, p.s.i. | 25,700 / 46,700 |

EXAMPLES 3-5

The procedure described in Example 1 was repeated using the reverse sequence stretching technique described therein and the particular stretch ratios and temperature for transverse direction stretching given in Table III. In all other respects, the processes of Examples 3-5 were identical to that described in Example 1.

As controls, the conventional sequence (longitudinal first) stretching technique was used. Except for stretch ratios and temperature of transverse direction stretching, the procedures for the controls were identical to that described for the control of Example 1.

Table III

| Example | Stretch Ratio TD | Stretch Ratio LD | TD Stretch Temperature, ° C. | Percent Gauge Variation |
|---|---|---|---|---|
| 3 | 3.3 | 3.05 | 85 | 3.7 |
| 4 | 3.3 | 3.5 | 85 | 4.4 |
| 5 | 3.4 | 3.4 | 85 | 5.1 |
| Control: | | | | |
| A | 3.3 | 3.1 | 83 | 18.0 |
| B | 3.4 | 3.0 | 92 | 15.0 |
| C | 3.4 | 3.2 | 92 | 16.0 |
| D | 3.4 | 3.2 | 84 | 14.0 |
| E | 3.3 | 3.1 | 84 | 17.0 |
| F | 3.3 | 3.2 | 84 | 15.0 |
| G | 3.3 | 3.1 | 80 | 16.0 |
| H | 3.3 | 3.2 | 80 | 16.0 |
| I | 3.3 | 3.1 | 87 | 16.5 |

EXAMPLE 6

Example 1 was repeated using two transverse direction stretch ratios, one within the invention and one outside, at a temperature of 80° C. Gauge magnification ratios were measured and are given below:

| Example | TD Stretch Ratio | Gauge Magnification Ratio |
|---|---|---|
| 6 | 3.5 | 1.5 |
| Control | 3.0 | 5.3 |

EXAMPLE 7

Example 1 was repeated using two transverse direction stretch ratios, one within the invention and one outside, at a temperature of 82° C. Gauge magnification ratios were measured and are given below:

| Example | TD Stretch Ratio | Gauge Magnification Ratio |
|---|---|---|
| 7 | 3.3 | 1.0 |
| Control | 3.0 | 1.5 |

EXAMPLES 8-9

Example 1 was repeated using three transverse direction stretch ratios, two within the invention and one outside, at a temperature of 84° C. Gauge magnification ratios were measured and are given below:

| Example | TD Stretch Ratio | Gauge Magnification Ratio |
|---|---|---|
| 8 | 3.5 | 1.9 |
| 9 | 3.8 | 0.85 |
| Control | 3.0 | 1.9 |

EXAMPLES 10-11

Example 1 was repeated using three transverse direction stretch ratios, two within the invention and one outside, at a temperature of 90° C. Gauge magnification ratios were measured and are given below:

| Example | TD Stretch Ratio | Gauge Magnification Ratio |
|---|---|---|
| 10 | 3.3 | 1.4 |
| 11 | 3.8 | 0.85 |
| Control | 3.0 | 3.1 |

As shown in the examples, the process of the present invention provides a surprising reduction in the gauge variation across the width of two-way stretched polyethylene terephthalate film. It is also apparent that the gauge variation existing in as-cast film is not substantially increased by the process whereas the tendency for such an increase is a critical shortcoming of the prior art. In fact, the process of the present invention may actually improve the gauge uniformity of the final film over its uniformity as cast.

The process permits the production of linear terephthalate ester films having either balanced or enhanced unidirectional tensile properties. Of particular importance is the fact that the linear terephthalic ester films having balanced tensile properties prepared by the process of the present invention show a marked reduction in tendency to suffer unbalanced tensile properties across the width of the sheet as a result of "bowing."

The process, by requiring transverse direction stretch first, also provides greater efficiency and higher production. The continuity of the longitudinal stretching and heat treating steps, which may be performed on heated rolls in a continuous manner, is not interrupted as in the prior art by the more cumbersome transverse direction stretching step.

Having fully described the invention, what is claimed is:

1. A process for treating a substantially amorphous polyethylene terephthalate film which comprises the steps, in sequence, of heating said film to a temperature of 80°-90° C.; stretching said film at the temperature of 80°-90° C. at least 3.3 times its initial width; thereafter, heating said film to a temperature of 90°-160° C. and stretching said film at the the temperature of 90°-160° C. 3.0-6.0 times its initial length.

2. A process as in claim 1 wherein said film is stretched at least 3.3 times its initial width at a temperature of 82°-85° C.

3. A process as in claim 1 wherein said film is stretched at least 3.0-6.0 times its initial length at a temperature of 115°-160° C.

4. A process as in claim 1 wherein the two-way stretched film is heat-set at a temperature of 135°-250° C.

5. A process as in claim 1 wherein said film is heated to a temperature of 85°-110° C. and its dimensions maintained substantially constant prior to being stretched 3.0-6.0 times its initial length.

6. A process for preparing polyethylene terephthalate film which comprises the steps in sequence, of extruding molten polyethylene terephthalate at a temperature of 270°-315° C. in the form of a film; quenching said film at a temperature of 60°-80° C. to form a substantially amorphous polyethylene terephthalate film; heating said film to a temperature of 80°-90° C.; drawing said film in the direction transverse to the direction of extrusion at least 3.3 times its initial width at a temperature of 80°-90° C.; heating said film to a temperature of 90°-160° C.; and drawing said film in the direction of extrusion 3.0-6.0 times its initial length at the temperature of 90°-160° C.

7. A process as in claim 6 wherein said film is drawn in the direction transverse to the direction of extrusion at a temperature of 82°-85° C.

8. A process as in claim 6 wherein said film is drawn in the direction of extrusion at a temperature of 115°-160° C.

9. A process as in claim 6 wherein the two-way drawn film is heat-set at a temperature of 135°-250° C.

10. A process as in claim 6 wherein said film is heated to a temperature of 85°-110° C. and its dimensions maintained substantially constant prior to being drawn in the direction of extrusion.

11. A process for treating a substantially amorphous polyethylene terephthalate film which comprises the steps, in sequence, of heating said film to a temperature of 82°-90° C.; stretching said film at the temperature of 82°-90° C. at least "$S_m$" times its initial width, $S_m$ being determined from the equation $S_m = .025T + 1.25$ wherein T is the temperature of the film in degrees centigrade; thereafter, heating said film to a temperature of 90°-160° C. and stretching said film at the temperature of 90°-160° C. 3.0-6.0 times its initial length.

References Cited in the file of this patent

UNITED STATES PATENTS

| 2,578,899 | Pace | Dec. 18, 1951 |
| 2,627,088 | Alles et al. | Feb. 3, 1953 |